United States Patent
Khesin

(10) Patent No.: US 9,836,625 B2
(45) Date of Patent: Dec. 5, 2017

(54) INFORMATION PROTECTION METHOD AND SYSTEM

(71) Applicant: EMPIRE TECHNOLOGY DEVELOPMENT LLC, Wilmington, DE (US)

(72) Inventor: Oscar Khesin, San Jose, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 240 days.

(21) Appl. No.: 14/364,076

(22) PCT Filed: Sep. 27, 2013

(86) PCT No.: PCT/US2013/062064
§ 371 (c)(1),
(2) Date: Jun. 10, 2014

(87) PCT Pub. No.: WO2015/047283
PCT Pub. Date: Apr. 2, 2015

(65) Prior Publication Data
US 2015/0254478 A1    Sep. 10, 2015

(51) Int. Cl.
*H04L 29/06* (2006.01)
*G06F 21/87* (2013.01)
*H04L 9/30* (2006.01)
*G06F 1/24* (2006.01)
(Continued)

(52) U.S. Cl.
CPC ............... *G06F 21/87* (2013.01); *G06F 1/24* (2013.01); *G06F 1/263* (2013.01); *G06F 1/266* (2013.01); *G06F 9/30043* (2013.01); *H04L 9/30* (2013.01); *G06F 2221/2143* (2013.01)

(58) Field of Classification Search
CPC ........................................................ G06F 21/86
See application file for complete search history.

(56) References Cited

U.S. PATENT DOCUMENTS

| 5,748,084 A | 5/1998 | Isikoff |
| 8,185,735 B2 | 5/2012 | Rensin et al. |
| 8,250,038 B2 | 8/2012 | Li |

(Continued)

OTHER PUBLICATIONS

"Securing Today's Mobile Workforce", Juniper Networks, Inc., 2012, pp. 1-7 Also available at <URL: http://www.juniper.net/us/en/local/pdf/whitepapers/2000363-en.pdf>.

(Continued)

*Primary Examiner* — Jason K Gee
(74) *Attorney, Agent, or Firm* — Turk IP Law, LLC

(57) ABSTRACT

Techniques described herein generally relate to protecting information stored in a mobile communication device. In one embodiment, a mobile communication device may include a data security module, a control circuitry, a first memory unit configured to store a first information, a first battery unit configured to supply power to the mobile communication device, and a second battery unit configured to supply power to the data security module and the control circuitry in response to a trigger event. The data security module is further configured to activate the control circuitry to perform a particular action on the first information, such as at least a partial erasure of the first information.

12 Claims, 5 Drawing Sheets

(51) Int. Cl.
  *G06F 1/26* (2006.01)
  *G06F 9/30* (2006.01)

(56) References Cited

U.S. PATENT DOCUMENTS

| | | | |
|---|---|---|---|
| 2004/0070499 | A1 | 4/2004 | Sawinski |
| 2007/0086257 | A1* | 4/2007 | Bernier .................. G06F 21/554 365/218 |
| 2008/0301820 | A1 | 12/2008 | Stevens |
| 2009/0119468 | A1* | 5/2009 | Taylor ..................... G06F 21/88 711/166 |
| 2009/0143048 | A1 | 6/2009 | Ayanamcottil et al. |
| 2010/0145854 | A1* | 6/2010 | Messerges ............. G06Q 20/32 705/44 |
| 2011/0107435 | A1* | 5/2011 | Tawara ................... G06F 21/31 726/28 |
| 2011/0275343 | A1* | 11/2011 | Kollar ..................... H04W 4/20 455/404.2 |
| 2011/0307724 | A1 | 12/2011 | Shaw et al. |
| 2011/0314539 | A1 | 12/2011 | Horton |
| 2012/0233681 | A1 | 9/2012 | Adams et al. |
| 2013/0111227 | A1* | 5/2013 | Sauerwein, Jr. .......... G06F 1/26 713/300 |

OTHER PUBLICATIONS

"Internet Security for Android", Kaspersky, Retrieved on Apr. 16, 2014 at <URL: http://usa.kaspersky.com/products-services/home-computer-security/security-for-android/>.
Virtual Security Research, Retrieved on Apr. 16, 2014 at <URL:http://www.vsecurity.com/>.
"How to: Replace the iPhone 4's Battery," Youtube, Retrieved on Apr. 16, 2014 at <URL: http://www.youtube.com/watch?feature=player_embedded&v=KYvjuWg0614>, Video uploaded on Jan. 20, 2011.
"Apple continues to work on iDevice security with movement-based theft detection," Mikey Campbell, Nov. 1, 2012.
Josh Smith, "Security Guru: Don't Sell Your Android Phone Until Turning it Into Swiss Cheese," GottaBe Mobile, Feb. 27, 2012.
"Theft Aware 2.0 Trial, Itagents Interactive Software Solutions," Symantec Corporation, 2012.
Notification of Transmittal of the International Search Report and the Written Opinion of the International Searching Authority, International application No. PCT/US13/62064, dated Dec. 11, 2013.

* cited by examiner 300 computer program product 304 signal bearing medium 302 at least one of in response to a detected trigger event, one or more instructions for prompting for an authentication information;

after failing to receive the prompted authentication information within a period of time, one or more instructions for delivering power of a second battery unit to a data security module and control circuitry; and/or one or more instructions for using the powered data security module to activate the control circuitry to perform a particular action on a first information stored in a first memory unit, wherein the particular action includes wiping out the first information entirely or partially 306 communication medium 308 non-transitory computer readable medium 310 recordable medium

Fig. 3

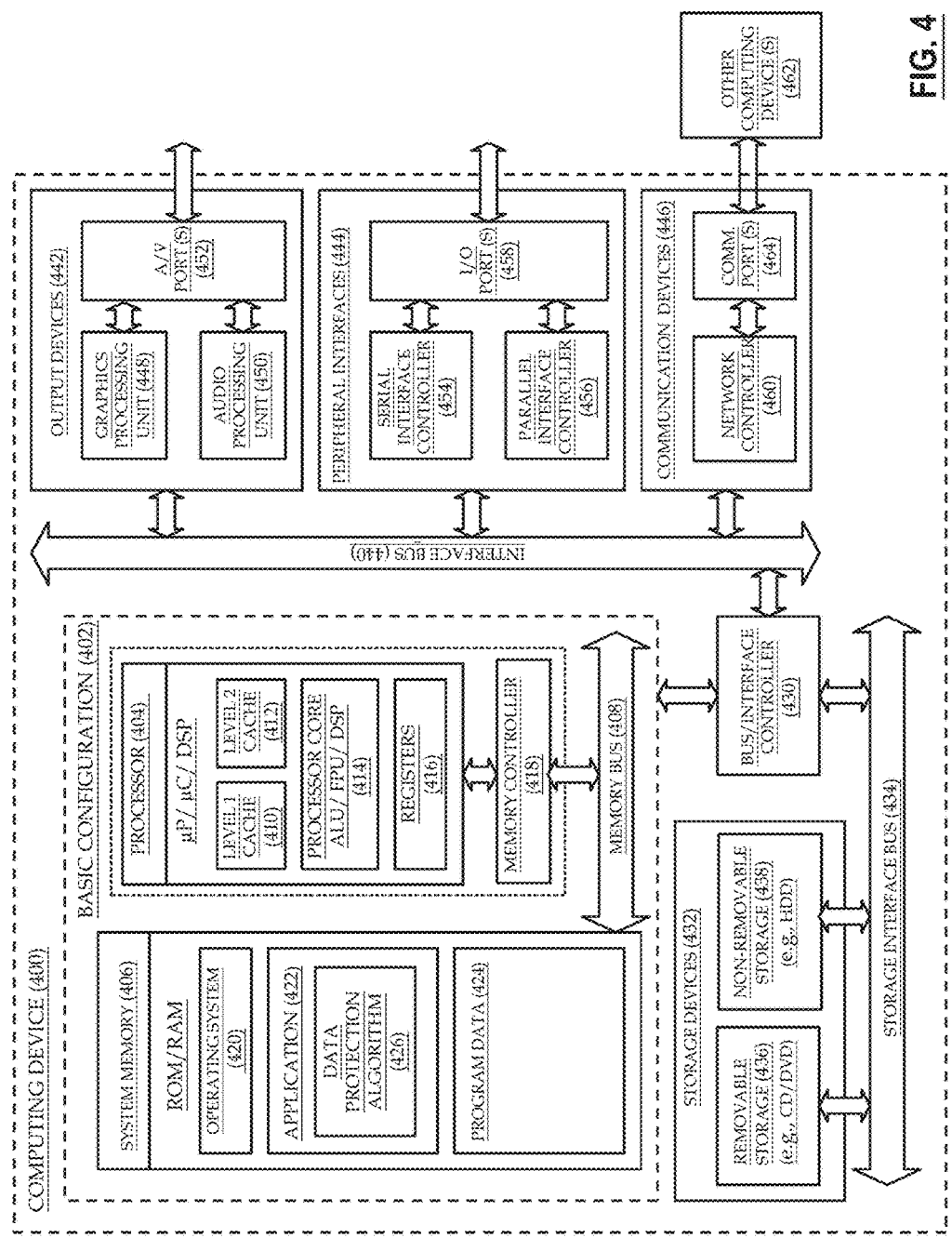

INFORMATION PROTECTION METHOD AND SYSTEM

CROSS-REFERENCE TO RELATED APPLICATION

The present application is a U.S. National Stage filing under 35 U.S.C. §371 of International Application No. PCT/US2013/062064, filed on Sep. 27, 2013, entitled "INFORMATION PROTECTION METHOD AND SYSTEM." International Application No. PCT/US2013/062064, including any appendices or attachments thereof, is hereby incorporate by reference in its entirety.

BACKGROUND

Unless otherwise indicated herein, the approaches described in this section are not prior art to the claims in this application and are not admitted to be prior art by inclusion in this section.

As mobile communication devices become an integral part of our daily lives, more and more information is being stored in these mobile communication devices for convenience.

However, when a mobile communication device is lost or stolen, sensitive information stored in such a mobile device (such as credit card information or bank account information) may be exposed to unauthorized accesses.

When an owner of the mobile communication device realizes that his/her mobile communication device may have been misplaced, the owner could possibly locate the mobile communication device and then remotely lock the mobile communication device and/or erase the sensitive information stored in the device. However, locating the mobile communication device may not be a viable option if the mobile communication device is not powered.

Moreover, even if the mobile communication device is located, and the information stored in the mobile communication device is successfully erased, since all the stored information in the convention approach is erased, irrespective of the sensitivity or confidentiality of the information, recovering and/or rebuilding the erased information can be time consuming and costly.

BRIEF DESCRIPTION OF THE DRAWINGS

So that the manner in which the above recited features of the disclosure can be understood in detail, a more particular description of the disclosure may be had by reference to embodiments, some of which are illustrated in the drawings. It is to be noted, however, that the drawings illustrate only typical embodiments and are therefore not to be considered limiting of its scope, for the disclosure may admit to other equally effective embodiments:

FIG. 3 is a block diagram illustrating a computer program product that is arranged to protect information stored in a mobile communication device; and FIG. 4 is a block diagram illustrating an example computing device that is arranged to protect sensitive data, all arranged in accordance with at least some embodiments of the present disclosure.

DETAILED DESCRIPTION

Various embodiments are described hereinafter with reference to the figures. It should be noted that the figures are not drawn to scale. It should also be noted that the figures are only intended to facilitate the description of embodiments. They are not intended as an exhaustive description of the disclosure or as a limitation on the scope of the disclosure. In addition, an aspect described in conjunction with a particular embodiment is not necessarily limited to that embodiment and can be practiced in any other embodiments.

Figure 1A:
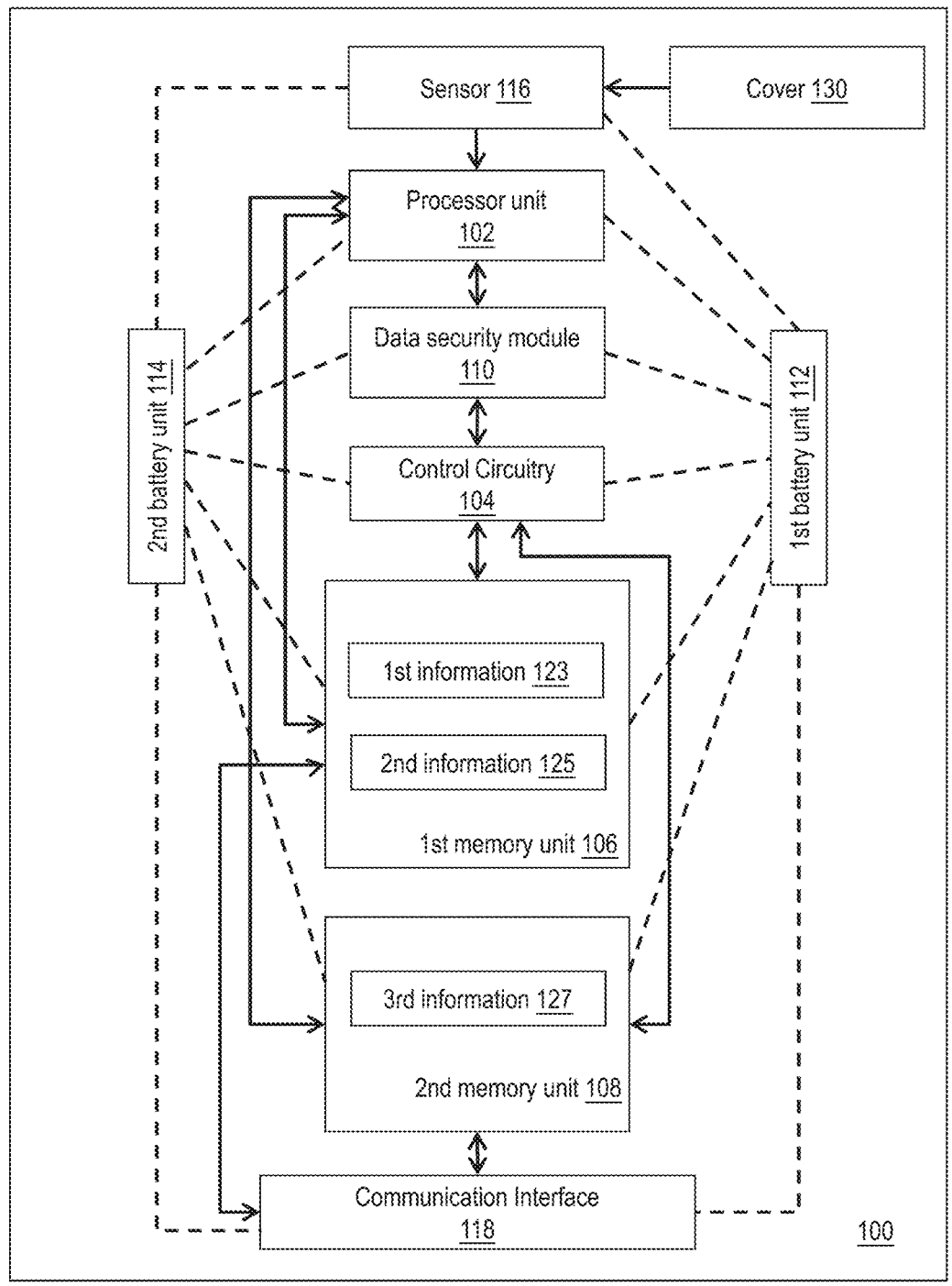
FIG. 1A is a block diagram of a mobile communication device.

FIG. 1A is a block diagram of a mobile communication device 100, in accordance with at least some embodiments of the present disclosure. The mobile communication device 100 may include a processor unit 102, control circuitry 104, a first memory unit 106, a second memory unit 108, a data security module 110, a first battery unit 112, a second battery unit 114, a sensor 116, and a communication interface 118. The mobile communication device 100 may also include a removable cover, such as a cover 130 (not drawn to scale). Some examples of the mobile communication device 100 may include, without limitation, a smart phone, a tablet device, a laptop computer, a cellular phone, and others.

For clarity, dotted lines shown in FIG. 1A may correspond to power supplied by the first battery unit 112 and the second battery unit 114, and solid lines shown in FIG. 1A may correspond to data flow among the various illustrated components.

In some embodiments, the processor unit 102 may be coupled to the sensor 116, the first memory unit 106, the second memory unit 108, and the control circuitry 104. The control circuitry 104, which may include logic components and a memory controller coupled to the first memory unit 106 and the second memory unit 108 to control erasing/writing/reading to these memory units. The memory units may be coupled to the communication interface 118. The data security module 110 may be coupled to the processor unit 102 and the control circuitry 104. All the components may be coupled to the first battery unit 112, and some or all of the components may be coupled to the second battery unit 114. In the example configuration shown in FIG. 1A, at least the data security module 110, the control circuitry 104, the first memory unit 106, and the second memory unit 108 may be coupled to the second battery unit 114.

In some other embodiments, the sensor 116 may also be coupled directly to the data security module 110, so that it may be powered by the second battery unit 114. Thus, even if the communication device 100 is turned off normally by its user or if the first battery unit 112 is lost and/or discharged, the sensor 116 may still be functional.

In some embodiments, the sensor 116 may be configured to detect whether the cover 130 of the mobile communication device 100 has been opened, whether a battery unit has been physically tampered with (e.g., removal or destruction of the first battery unit 112), whether the mobile communication device 100 is outside of its typical coverage area, and other events. Depending on the type of the communication device 100, the range of the typical coverage area may vary. For instance, the communication device 100 may support, without limitation, the third generation of mobile telecommunications technology (3G), the fourth generation of mobile telecommunications technology (4G), Long Term Evolution (LTE), Wi-Fi, and Bluetooth. The sensor 116 may be configured to send signals to the processor unit 102 for processing, wherein the signals sent by the sensor 116 may be indicative of these events.

By applying electromagnetic principals, the sensor 116 may be implemented using an inductive coil micro sensor, and a magnetic, such as ferrite, strip/plate may be installed on the cover 130, so that the magnetic strip/plate may be aligned across this inductive coil micro sensor. Depending on the vicinity of the magnetic strip/plate in relation to the inductive coil sensor, e.g., depending on the cover 130 being opened or closed, the difference in the inducted current may generate the signal corresponding to the "cover open/closed" event.

Alternatively, the sensor 116 may be implemented using an integrated light-emitting diode (LED)/photo-detector, and a LED/photo-detector reflective strip/plate (e.g., mirror) may be installed on the cover 130, so that the reflective strip/plate may be aligned to the LED/photo-detector. In such a case, opening the cover 130 may result in the loss of the reflected light by photo-detector, which may generate the signal corresponding to the "cover open" event.

In other embodiments, the sensor 116 may be implemented using an electromechanical micro switch, so that when the cover 130 is opened, the current may flow through the sensor 116, leading to the generation of the signal corresponding to the "cover open" event.

In some embodiments, the first memory unit 106 and the second memory unit 108 may be configured to store information with varying levels of sensitivity and/or confidentiality. For example, at the time the information is stored in the mobile communication device 100, the person using the mobile communication device 100 may be prompted to assign levels of sensitivity and/or confidentiality to the information to be stored. Depending on the assigned level of sensitivity and/or confidentiality, the information may be stored in different locations. To illustrate, the more sensitive and/or confidential information, such as first information 123 and second information 125 may be stored in the first memory unit 106, and the less sensitive and/or confidential information, such as the third information 127, may be stored in the second memory unit 108. A person's bank account information may be viewed to be more sensitive than the person's haircut appointment information, for example. A person's business proposal may be viewed to be more confidential than a random digital coupon received by the person, for example. In the example configuration of FIG. 1A, the first information 123 may correspond to the personal information of the owner, and the second information 125 may correspond to information of the owner's business. The third information 127 may correspond to information relating to the owner's friends. Additional security and/or confidentiality levels may be assigned within a set of information, such that for instance, the first information 123 may further include sets of information having different security and/or confidentiality levels.

As an example, suppose the first information 123 is associated with a security level of five (5) and above; the second information 125 is associated with a security level of seven (7) and above; and the third information 127 is associated with a security level of three (3) and below, with relatively higher security and/or confidentiality levels being indicated by these higher numerical levels and relatively lower security and/or confidentiality levels being indicated by these lower numerical levels. The first information 123 may further include multiple sets of information. One set may include the owner's financial information, such as bank account numbers, credit card numbers, and others, having a security level of 7, for example. Another set may include the owner's identification information, such as his/her driver's license number, passport number, and others, having a security level of 6, for example. The second information 125 may include tax information of the owner's business, for example. The third information 127 may include articles written by the owner's friends, for example.

Another example of sensitive and/or confidential information may include status history and authentication results associated with the mobile communication device 100. For example, the second information 124 may include status history of the mobile communication device 100 (e.g., how long the mobile communication device 100 may have lost power from the first battery unit 112) and authentication results (e.g., how many times the entry of authentication information prompted by the data security module 110 has failed). Such status history and authentication results may be usable to determine whether to entirely or partially erase the first information 123. Additional details relating to the erasure of information from the mobile communication device 100 will be discussed in the subsequent paragraphs.

In some embodiments, when a trigger event (e.g., physical tampering of the first battery unit 112, opening of the cover 130 of the mobile communication device 100, leaving the typical coverage area by the mobile communication device 100, and/or others) is detected, and the trigger event is authenticated within a certain period of time, the second battery unit 114 may be configured to supply power to components such as the processor unit 102, the control circuitry 104, the data security module 110, the first memory unit 106, the second memory unit 108, and the communication interface 118. The second battery unit 114 may be placed in a location inside the mobile communication device 100 that is not easily accessible. For example, the second battery unit 114 may not be visible once the cover 130 of the mobile communication device 100 is opened, and accessing the second battery unit 114 may require disassembly of physical parts of the mobile communication device 100. As a result, an unauthorized user of the mobile communication device 100 may not be aware of the existence of the second battery unit 114, and even when he/she is aware of its existence, he/she may not be able to quickly interrupt the power supplied by the second battery unit 114 to the mobile communication device 100.

Figure 1B:
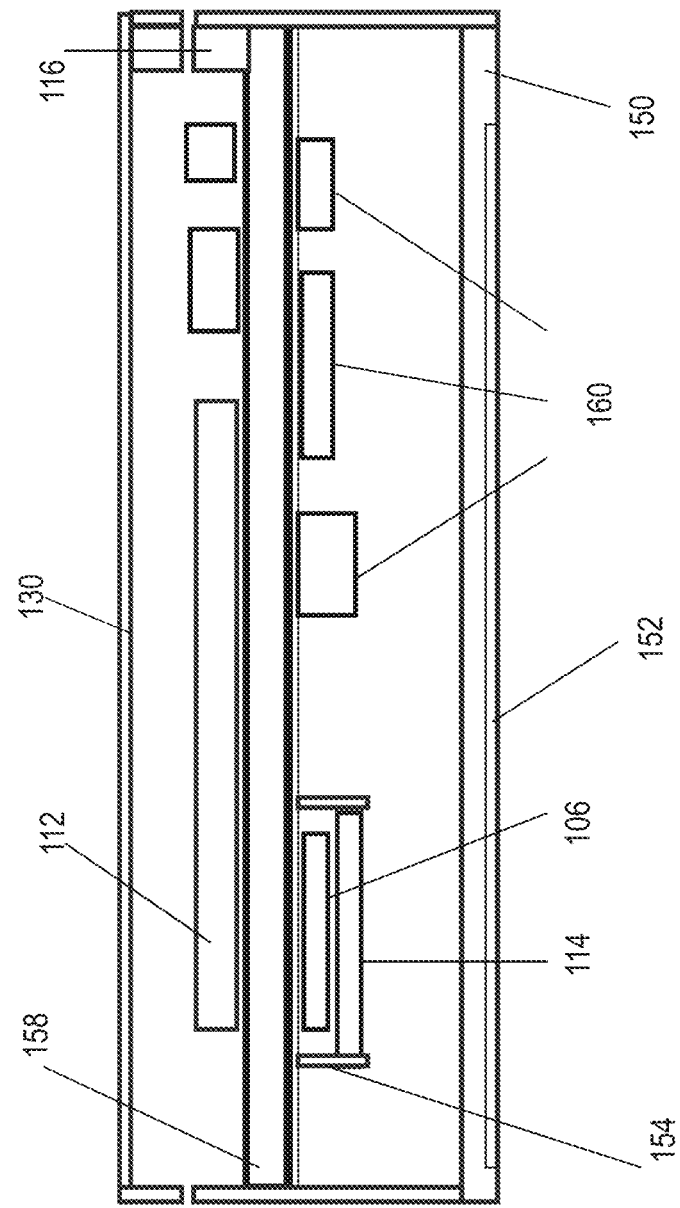
FIG. 1B is a block diagram illustrating certain physical arrangements of parts in a communication device.

In some embodiments, the first battery unit 112, the second battery unit 114, the first memory unit 106, and/or the second memory unit 108 may be coin-like sized. FIG. 1B is a block diagram illustrating certain physical arrangements of parts in the mobile communication device 100, in accordance with at least some embodiments of the present disclosure. The mobile communication device 100 may have a case 150 and a display screen 152. The cover 130 and the case 150 may form an enclosure for the various parts of the mobile communication device 100, such as, without limitation, a printed circuit board 158, the first memory unit 106 (and/or the second memory unit 108, not shown in FIG. 1B), the first battery unit 112, the second battery unit 114, and other components 160. Opposite from the cover 130, the first memory unit 106 and/or the second battery unit 114 may be placed within a holder 154. The first memory unit 106 and/or the second battery unit 114 may also be sealed, for instance, by epoxy glue. With such an example configuration, time is required to dissemble the mobile communication device 100 to find and remove the first memory unit 106 and/or the second battery unit 114.

The data security module 110 may be configured to evaluate trigger events and protect the sensitive and/or confidential information of the mobile communication device 100 by potentially instructing the control circuitry 104 to erase certain information from the memory units of the mobile communication device 100. Thus, even if an unauthorized user of the mobile communication device 100 successfully removes the first battery unit 112, this user still may not be able to retrieve any sensitive and/or confidential information. An example process that the data security module 110 may follow to protect the sensitive and/or confidential information of the mobile communication device 100 is illustrated in at least FIG. 2 and detailed in subsequent paragraphs.

The data security module 110 illustrated in FIG. 1A may be implemented as an Application-Specific Integrated Circuit (ASIC). Alternatively or additionally, the data security module 110 may also be implemented in software or other computer-readable instruction stored on a computer-readable medium (such as the first memory unit 106, the second memory unit 108, or other memory unit) and executable by the processor unit 102, or implemented in a combination of hardware and software. For instance, using the example configuration shown in FIG. 1A, the second memory unit 108 may contain executable instructions for evaluating trigger events and protecting the sensitive and/or confidential information of the mobile communication device 100. When the executable instructions are executed by the processor unit 102, the processor unit 102 may be configured to process the signals generated by the sensor 116 and interact with the control circuitry 104, the memory units, and/or the communication interface 118. The combination of the executable instructions and the processor unit 102 may support the functions of the data security module 110.

In the above-mentioned software implementation, since the second memory unit 108 may store both the executable instructions and potentially less sensitive and/or confidential information (e.g., the third information 127), the content of the second memory unit 108 may not be erased entirely when the mobile communication device 100 is determined to have been lost or stolen.

Figure 2:
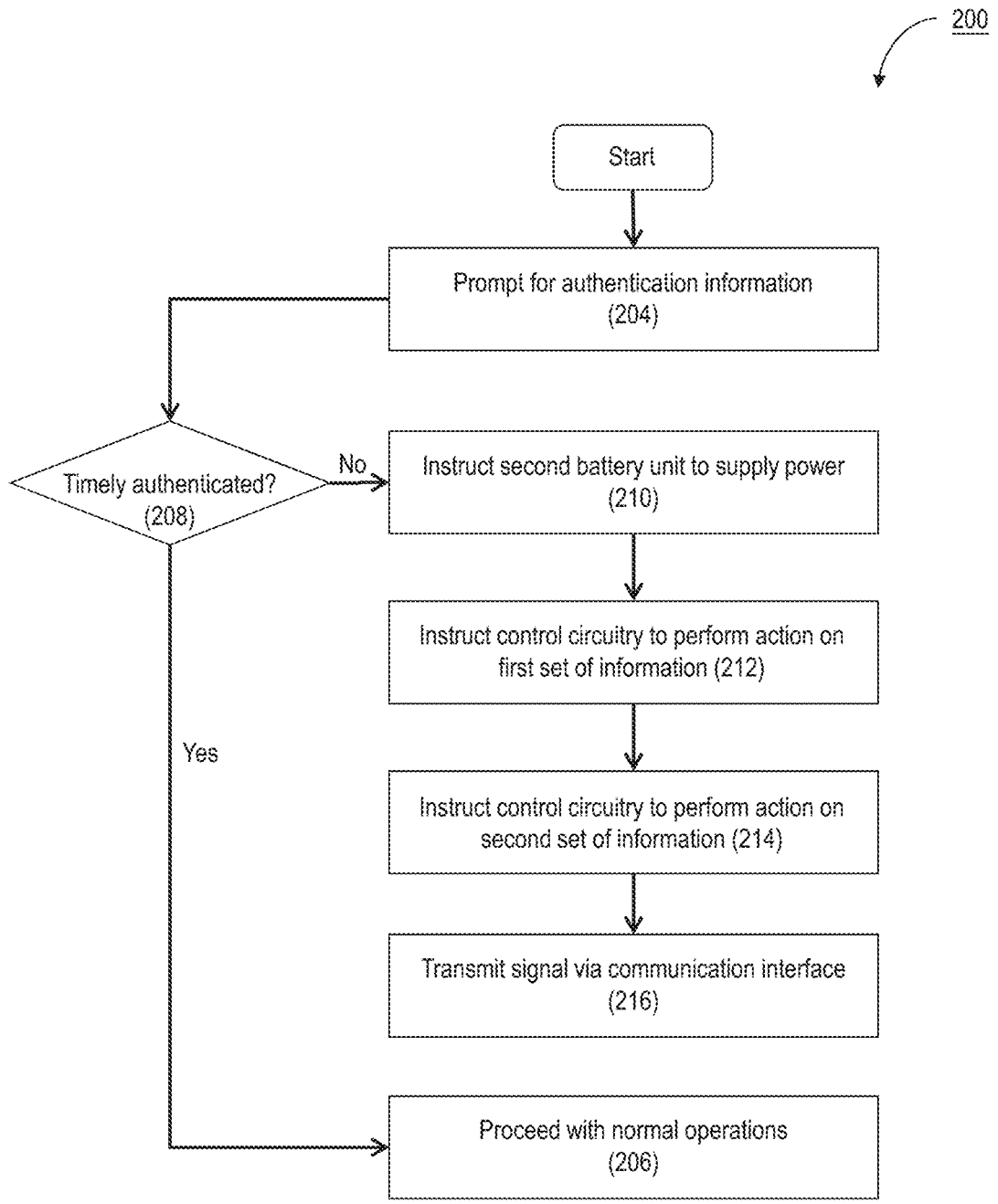
FIG. 2 illustrates a flow chart of an example method to protect information stored in a mobile communication device.

In conjunction with FIG. 1A, FIG. 2 illustrates a flow chart of an example method 200 to protect information stored in a mobile communication device, in accordance with at least some embodiments of the present disclosure. The method 200 may include one or more operations, functions, or actions as illustrated by one or more of blocks 204, 206, 208, 210, 212, 214 and/or 216. Although the blocks are illustrated in a sequential order, these blocks may also be performed in parallel, and/or in a different order than those described herein. Also, the various blocks may be combined into fewer blocks, divided into additional blocks, and/or eliminated based upon the particular implementation. Additional blocks representing other operations, functions, or actions may be provided.

The method 200 may begin in block 204 "prompt for authentication information." Block 204 may be followed by block 208 "timely authenticated?"

If the received authentication information is timely authenticated, block 208 may also be followed by block 206. Otherwise, block 208 may be followed by block 210 "instruct second battery unit to supply power." Block 210 may be followed by block 212 "instruct control circuitry to perform action on first set of information," which may be followed by block 214 "instruct control circuitry to perform action on second set of information." Block 214 may be followed by block 216 "transmit signal via communication interface."

In block 204, the data security module 110 may be configured to prompt for authentication information from a user of the mobile communication device 100. The authentication information may be, for example, a password, a user override command, or other input from the user to indicate that the detected event is for a legitimate purpose. In one embodiment, the authentication (e.g., password entry) may need to be performed within a particular timeframe and/or within a number of attempts within the particular timeframe.

In some embodiments, the data security module 110 may be configured to perform the operations of block 204 in response to a trigger event. Some examples of a trigger event may include, without limitation, physical tampering of the first battery unit 112, opening of the cover 130 of the mobile communication device 100, leaving the typical coverage area by the mobile communication device 100, and/or other events. Either the processor unit 102 or the data security module 110 may be configured to process information collected by the sensor 116 and determine whether such a trigger event has been detected or has otherwise occurred.

If the authentication information received by the mobile communication device 100 is accurate and timely received in block 208, then the data security module 110 may determine that normal operations may continue in block 206, including enabling the user to remove or replace the first battery unit 112 and/or the second battery unit 114 without causing an unintended erasure of data.

On the other hand, suppose an unauthorized user has figured out the authentication information (e.g., such as a password) but exceeded the required period of time to figure out and enter the password. In block 210, the data security module 110 may be configured to instruct the second battery unit 114 to supply power to the mobile communication device 100. It should be noted that the switch from the first battery unit 112, which may power the mobile communication device 100 when the mobile communication device 100 operates routinely, to the second battery unit 114 may take place irrespective of whether the first battery unit 112 is removed from the mobile communication device 100, so long as the received authentication information is inaccurate and/or the required period of time is expired before receiving the authentication information.

In block 212, the data security module 110 may be configured to instruct the control circuitry 104 to perform an action on a first set of information (e.g., the first information 123). The action to be performed may include entirely or partially erasing the first information 123 from the first memory unit 106. Erasing the first information 123 (and/or erasing the information from any of the other memory units) may involve redundant overwriting, physical destruction, reformatting, and/or other operation to remove or to otherwise make the first information 123 unreadable, inaccessible, or unavailable.

In block 214, the data security module 110 may be configured to instruct the control circuitry 104 to perform an action on a second set of information (e.g., the second information 125). The action to be performed may include entirely or partially erasing the second information 125 from the second memory unit 108.

In some embodiments, the action performed in block 212 may take place prior to the action performed in block 214, because the sensitivity and/or confidentiality level of the first information 123 may be higher than the level of the second information 125. In other words, the more sensitive and/or confidential information may be erased first.

In some embodiments, as discussed above, the first information 123 or the second information 125 may include additional levels of sensitivity and/or confidentiality. For example, suppose the first information 123 includes a first subset of information having a higher sensitivity and/or confidentiality level than a second subset of information. In such an arrangement, the first subset of information may be erased ahead of the second subset of information.

In some embodiments, the action to be performed on the first set of information in block 212 may be based on the second set of information. As discussed above, the second set of information (e.g., the second information 125) may include status history of the mobile communication device 100 (e.g., how long the mobile communication device 100 may have lost power from the first battery unit 112) and authentication results (e.g., how many times the entry of authentication information prompted by the data security module 110 has failed). The data security module 110 may be configured to determine whether to partially or entirely erase the first set of information in block 212 based on such status history and authentication results.

Through the powered communication interface 118, in block 216, the data security module 110 may be configured to generate and transmit a signal, such as an alert signal or a positional signal, so that the mobile communication device 100, which may have been stolen or lost, may be located. Such signal may be sent to another device of the rightful owner of the mobile communication device, to a service provider, to law enforcement, and/or to some other entity.

FIG. 3 is a block diagram illustrating a computer program product 300 that is arranged to protect information stored in a mobile communication device, in accordance with at least some embodiments of the present disclosure. Computer program product 300 may include signal bearing medium 304, which may include one or more sets of executable instructions 302 that, when executed by, for example, the processor unit 102 of the mobile communication device 100 of FIG. 1A, may provide at least the features described above and illustrated in FIG. 2.

In some implementations, signal bearing medium 304 may encompass non-transitory computer readable medium 308 or another similar recordable medium 310, such as, but not limited to, a hard disk drive (HDD), a Compact Disc (CD), a Digital Versatile Disk (DVD), a digital tape, memory, etc. In some implementations, signal bearing medium 304 may encompass recordable medium 310, such as, but not limited to, memory, read/write (R/W) CDs, R/W DVDs, etc. In some implementations, signal bearing medium 304 may encompass communications medium 306, such as, but not limited to, a digital and/or an analog communication medium (e.g., a fiber optic cable, a waveguide, a wired communication link, a wireless communication link, etc.)

FIG. 4 is a block diagram illustrating an example computing device 400 that is arranged to protect sensitive data, in accordance with at least some embodiments of the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP core), or any combination thereof. An example memory controller 418 may also be used with processor 404, or in some implementations, memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a data protection algorithm 426 that is arranged to perform the functions as those described with respect to at least method 200 of FIG. 2. Program data 424 may be useful for operation with data protection algorithm 426 as is described herein. In some embodiments, application 422 may be arranged to operate with program data 424 on operating system 420. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more NV ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link, such as, without limitation, optical fiber, Long Term Evolution (LTE), 3G, WiMax, via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link and/or channel, a wireless communication link and/or channel, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A mobile communication device, comprising:
a data security circuit;
control circuitry;
a first memory configured to store first information;
a first battery configured to supply power to the mobile communication device; and
a second battery configured to supply power to the data security circuit and the control circuitry in response to at least one trigger event, wherein the second battery is disposed at a sealed location inside the mobile communication device that is reachable by removal or disassembly of a plurality of internal components located inside of a housing of the mobile communication device,
wherein the at least one trigger event includes the mobile communication device being out of communication coverage of a communication network of the mobile communication device,
wherein the data security circuit is configured to determine whether to partially or entirely erase the first information ahead of second information stored in the first memory, in response to:
a time duration during which power was not supplied to the mobile communication device from the first battery exceeds a particular duration, and
a number of times in which an entry of authentication information prompted by the data security circuit has failed is greater than a threshold value, and
wherein the control circuitry is configured to partially or entirely erase the first information based on the determination.

2. The mobile communication device of claim 1, wherein the at least one trigger event includes detection, by a sensor of the mobile communication device, of an opening of a cover of the mobile communication device.

3. The mobile communication device of claim 2, wherein the at least one trigger event includes interruption of the power supplied by the first battery to the mobile communication device due to physical tampering of the first battery.

4. The mobile communication device of claim 1, wherein the data security circuit is configured to authenticate information received by the mobile communication device within a period of time before the control circuitry partially or entirely erases the first information.

5. The mobile communication device of claim 1, wherein the data security circuit is configured to cause the control circuitry to power a communication interface of the mobile communication device to send out positional information of the mobile communication device.

6. The mobile communication device of claim 1, wherein the data security circuit is configured to prompt for an input of an authentication information before having the second battery supply power to the data security circuit and the control circuitry.

7. An apparatus, comprising:
a data security circuit;
control circuitry;
a first memory coupled to the control circuitry and configured to store first information and second information;
a plurality of internal components coupled to the first memory and configured to support mobile communication;

a sensor that includes one of an integrated light emitting diode and a photo-detector; and a housing coupled to the sensor and configured to contain the data security circuit, the control circuitry, the first memory, and the plurality of internal components, wherein:

the first memory and at least some of the plurality of internal components are configured to be powered by a first battery, the data security circuit and the control circuitry are configured to be powered by a second battery in response to at least one trigger event, wherein the at least one trigger event includes detection, by the sensor, of an opening of a cover of the housing, wherein the cover comprises a strip, wherein the strip includes a reflective strip, wherein the sensor is configured to detect the opening of the cover when an alignment or vicinity of the strip changes relative to the sensor, and wherein the detection of the opening of the cover is determined from a loss of reflected light caused by the change in one of the alignment or vicinity of the strip relative to the sensor as a result of the opening of the cover, the data security circuit is further configured to activate, in response to the at least one trigger event, the control circuitry to perform at least a partial erasure of the first information stored in the first memory in response to a level of sensitivity of the first information being higher than a level of sensitivity of the second information stored in the first memory, and the second battery is disposed at a sealed location inside the housing, the sealed location being reachable by removal or disassembly of at least one of the plurality of internal components contained in the housing.

8. The apparatus of claim 7, wherein the at least one trigger event includes a failure to receive valid authentication information within a timeframe.

9. The apparatus of claim 7, further comprising:
a printed circuit board; and
a holder coupled to the printed circuit board, wherein at least one of the second battery and the first memory is sealed within the holder.

10. The apparatus of claim 7, wherein the sensor includes one of an inductive micro sensor, an integrated light-emitting diode and photo-detector, and an electromechanical micro switch.

11. The apparatus of claim 7, wherein the at least one trigger event includes the apparatus being out of communication coverage of a communication network of the apparatus.

12. An apparatus, comprising:
a data security circuit;
control circuitry;
a first memory coupled to the control circuitry and configured to store first information and second information;
a plurality of internal components coupled to the first memory and configured to support mobile communication;
a sensor that includes an inductive coil micro sensor; and
a housing coupled to the sensor and configured to contain the data security circuit, the control circuitry, the first memory, and the plurality of internal components, wherein:

the first memory and at least some of the plurality of internal components are configured to be powered by a first battery, the data security circuit and the control circuitry are configured to be powered by a second battery in response to at least one trigger event, wherein the at least one trigger event includes detection, by the sensor, of an opening of a cover of the housing, wherein the cover comprises a strip, wherein the strip includes a magnetic strip, wherein the sensor is configured to detect the opening of the cover when an alignment or vicinity of the strip changes relative to the sensor, and wherein the detection of the opening of the cover is determined by estimation of a difference in an inducted current generated by the change in one of the alignment or vicinity of the strip relative to the sensor caused by the opening of the cover, the data security circuit is further configured to activate, in response to the at least one trigger event, the control circuitry to perform at least a partial erasure of the first information stored in the first memory in response to a level of sensitivity of the first information being higher than a level of sensitivity of the second information stored in the first memory, and the second battery is disposed at a sealed location inside the housing, the sealed location being reachable by removal or disassembly of at least one of the plurality of internal components contained in the housing.

* * * * *

UNITED STATES PATENT AND TRADEMARK OFFICE
CERTIFICATE OF CORRECTION

| | | |
|---|---|---|
| PATENT NO. | : 9,836,625 B2 | Page 1 of 1 |
| APPLICATION NO. | : 14/364076 | |
| DATED | : December 5, 2017 | |
| INVENTOR(S) | : Khesin | |

It is certified that error appears in the above-identified patent and that said Letters Patent is hereby corrected as shown below:

In the Specification

In Column 1, Line 13, delete "incorporate" and insert -- incorporated --, therefor.

In Column 8, Line 63, delete "NV ports" and insert -- A/V ports --, therefor.

Signed and Sealed this
Seventeenth Day of April, 2018

Andrei Iancu
*Director of the United States Patent and Trademark Office*